(12) United States Patent
Eguchi

(10) Patent No.: US 10,027,182 B2
(45) Date of Patent: Jul. 17, 2018

(54) WIRELESS POWER TRANSFER DEVICE, CONTROL METHOD FOR WIRELESS POWER TRANSFER DEVICE AND PROGRAM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 14/314,389

(22) Filed: Jun. 25, 2014

(65) Prior Publication Data

US 2015/0001936 A1    Jan. 1, 2015

(30) Foreign Application Priority Data

Jun. 26, 2013  (JP) .................. 2013-133525

(51) Int. Cl.
| | |
|---|---|
| H02J 50/40 | (2016.01) |
| H04B 5/00 | (2006.01) |
| H02J 50/00 | (2016.01) |
| H02J 50/90 | (2016.01) |
| H02J 50/80 | (2016.01) |
| H02J 5/00 | (2016.01) |

(52) U.S. Cl.
CPC .............. H02J 50/40 (2016.02); H02J 5/005 (2013.01); H02J 50/00 (2016.02); H02J 50/80 (2016.02); H02J 50/90 (2016.02); H04B 5/0031 (2013.01); H04B 5/0037 (2013.01); Y10T 307/469 (2015.04)

(58) Field of Classification Search
CPC ....................................................... H02J 50/40
See application file for complete search history.

(56) References Cited

U.S. PATENT DOCUMENTS

| | | | |
|---|---|---|---|
| 2012/0080957 A1* | 4/2012 | Cooper | H02J 5/005 307/104 |
| 2012/0306284 A1 | 12/2012 | Lee et al. | |
| 2013/0082653 A1* | 4/2013 | Lee | H02J 7/0027 320/108 |
| 2014/0015335 A1* | 1/2014 | Lee | H01F 38/14 307/104 |
| 2014/0035379 A1* | 2/2014 | Stevens | H02J 7/0013 307/104 |
| 2015/0171931 A1* | 6/2015 | Won | H02J 5/005 320/108 |

FOREIGN PATENT DOCUMENTS

| | | |
|---|---|---|
| JP | 2009278707 A | 11/2009 |
| JP | 2012-100491 A | 5/2012 |
| JP | 2012-519460 A | 8/2012 |
| JP | 2013-27074 A | 2/2013 |

* cited by examiner

*Primary Examiner* — Daniel Cavallari
(74) *Attorney, Agent, or Firm* — Canon U.S.A., Inc. IP Division

(57) ABSTRACT

A wireless power transfer device includes a wireless power transfer unit that wirelessly transfers power to a plurality of other devices and a notification unit that provides notification that wireless power transfer to a third wireless power transfer device different from a second wireless power transfer device is not available or provides notification that the wireless power transfer to the third wireless power transfer device is available in the case where wireless power transfer to the second wireless power transfer device is performed.

17 Claims, 8 Drawing Sheets

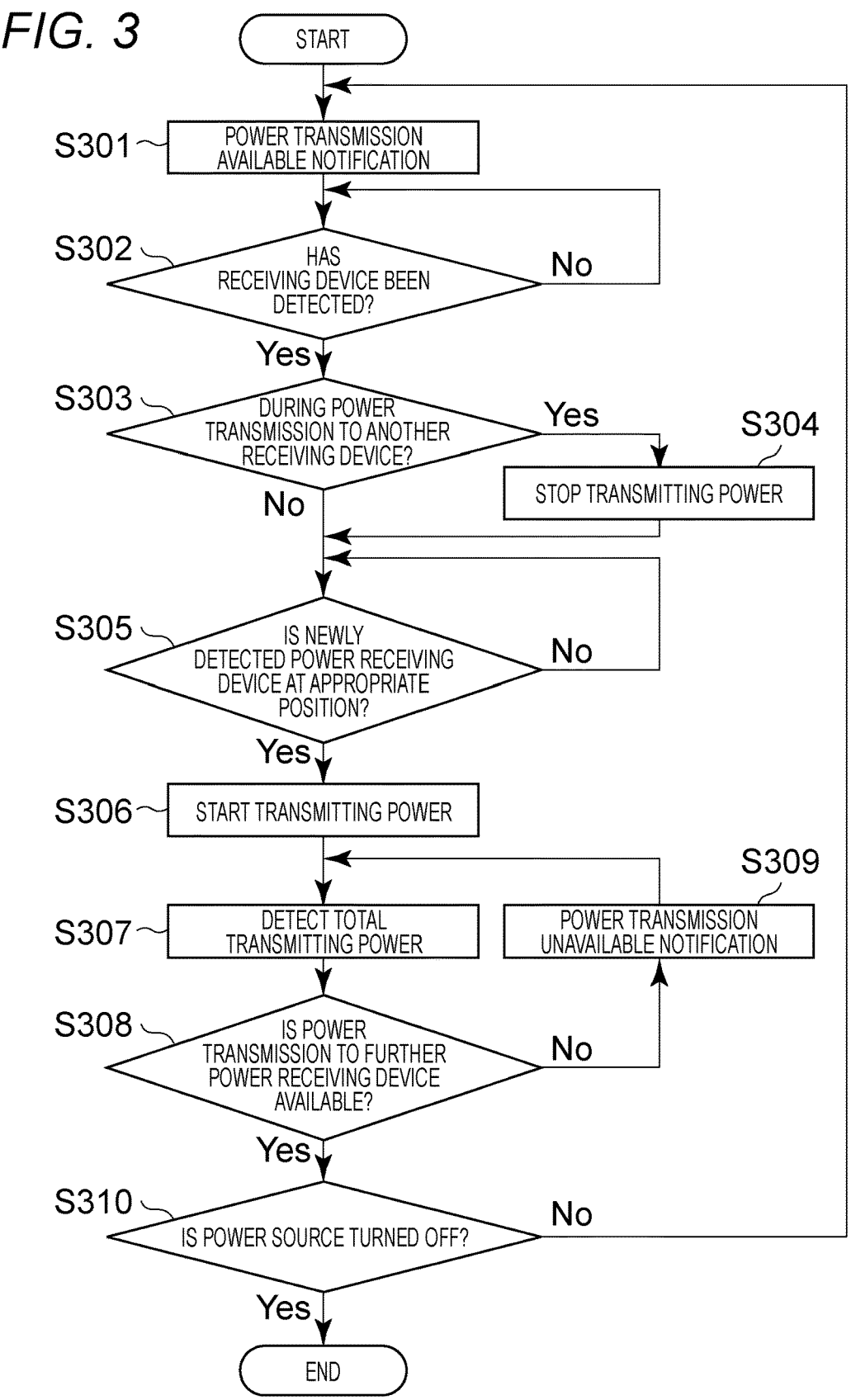

WIRELESS POWER TRANSFER DEVICE, CONTROL METHOD FOR WIRELESS POWER TRANSFER DEVICE AND PROGRAM

BACKGROUND

Field

The present invention generally relates to wireless power transfer.

Description of the Related Art

Recently, there has been known a wireless power transfer system including a power transmission device which wirelessly (non-contact) transmits power without being connected by a connector and a power receiving device which receives power supplied from the power transmission device ("Wireless technology developed to transmit power lights up a 60 W bulb in tests", Nikkei Electronics, Vol. 966, Dec. 3, 2007).

Through the wireless power transfer, a power receiving device can be charged by a simple operation of placing the power receiving device on the power transmission device. However, the power receiving device may not be able to be charged even though a user has placed the power receiving device on the power transmission device when the power transmission is not available due to some error. Therefore, it is necessary to notify a user of a state of the wireless power transfer. Japanese Patent Application Laid-Open No. 2013-27074 discloses a technique of notifying a user that the power transmission device having a plurality of power transmission coils has recognized the power receiving device, that the power receiving device is normally supplied with power, and which one of the coils is supplied with power during power transmission. Japanese Patent Application Laid-Open No. 2012-100491 discloses a technique in which the power receiving device notifies a user that a charging period of when the power transmission device transmits power to a plurality of power receiving devices becomes longer than that of when the power transmission device transmits power to a single power receiving device.

As described in Japanese Patent Application Laid-Open No. 2012-100491, in the wireless power transfer system in which the power transmission device can transmit power to the plurality of power receiving devices, the number or the power of the power receiving devices to which power can be transmitted may be limited depending on the capacity of the power transmission device. A case will be considered where the user places another power receiving device, different from the plurality of power receiving devices, on the power transmission device which is transmitting power to the maximum number of power receiving devices to which the power can be transmitted. In this case, the power transmission device may not be able to allocate the power to be transmitted to the another power receiving device, and the another power receiving device is not appropriately charged even though the another power receiving device is placed on the power transmission device.

However, in the related art, the user cannot recognize the power transmission device which cannot appropriately transmit power to the another power receiving device placed additionally. For example, the power transmission device in this case is transmitting power to the maximum number of power receiving devices to which the power can be transmitted.

Japanese Patent Application Laid-Open Nos. 2013-27074 and 2012-100491 notify that the power transmission device has recognized the power receiving device and that the charging period becomes late. However, Japanese Patent Application Laid-Open Nos. 2013-27074 and 2012-100491 do not consider allowing the user to recognize the power transmission device which cannot appropriately transmit power to the another power receiving device additionally placed before the user places the another power receiving device on the power transmission device.

SUMMARY

Aspects of present invention are generally related to notifying a user of a state of wireless power transfer by a device which can wirelessly transfer power to a plurality of other devices.

According to an aspect of the present invention, a wireless power transfer device includes a wireless power transfer unit that wirelessly transfers power to a plurality of other devices and a first notification unit that provides notification that wireless power transfer to a third wireless power transfer device different from a second wireless power transfer device is not available or provides notification that the wireless power transfer to the third wireless power transfer device is available in the case where wireless power transfer to the second wireless power transfer device is performed.

Further features of the present disclosure will become apparent from the following description of exemplary embodiments (with reference to the attached drawings).

BRIEF DESCRIPTION OF THE DRAWINGS

FIG. 3 is a flowchart of the power transmission device.

DESCRIPTION OF THE EMBODIMENTS

First Embodiment

Figure 1B:
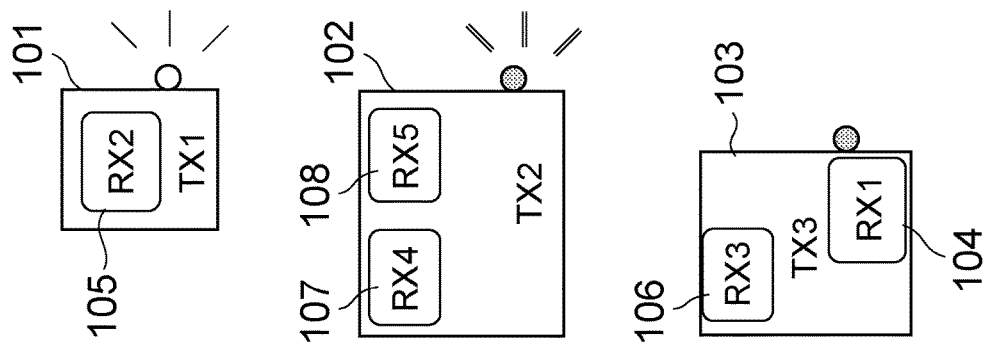
FIGS. 1A and 1B are diagrams of a wireless power transfer system.
Figure 1A:
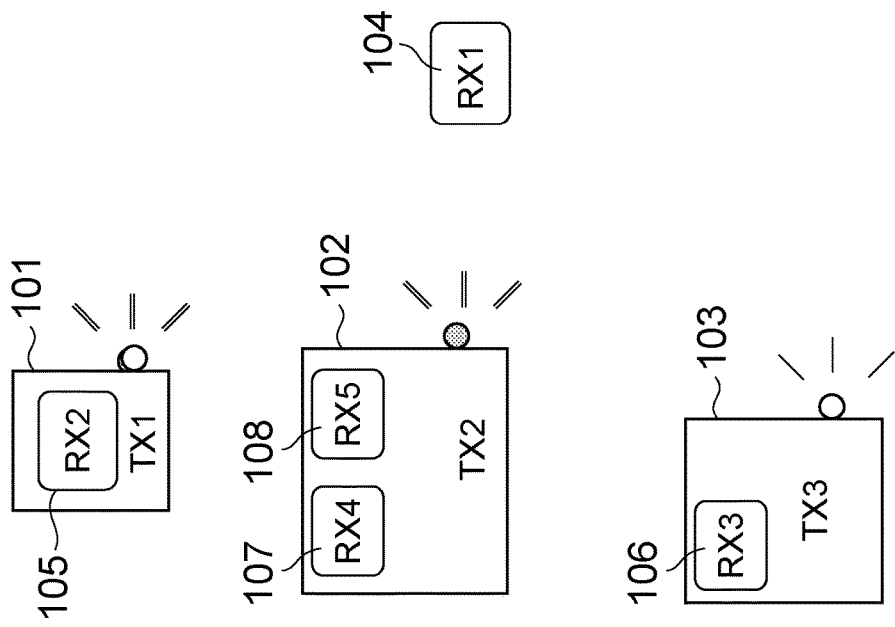

In the present embodiment, a wireless power transfer system having a power transmission device for transmitting power and a power receiving device for receiving power will be described. FIGS. 1A and 1B show an example of the wireless power transfer system of the present embodiment. FIGS. 1A and 1B are an example of the wireless power transfer system of the present embodiment and includes three power transmission devices TX1 to TX3 (101 to 103) and five power receiving devices RX1 to RX5 (104 to 108). Each of the power transmission devices TX1 to TX3 (101 to 103) is a wireless power transfer device which wirelessly transmits power. Each of the power receiving devices RX1 to RX5 (104 to 108) is an apparatus such as a mobile phone, a digital camera, a tablet terminal, and a home video. Each of power receiving devices RX1 to RX5 (104 to 108) is a wireless power transfer device which is charged by the power transmission device or wirelessly receives power to operate from the power transmission device.

In FIG. 1A, the power receiving device RX1 (104) is a device about to start charging through the wireless power transfer. The power receiving device RX2 (105) is located on the power transmission device TX1 (101) and power is wirelessly transferred to the power receiving device RX2 (105) from the power transmission device TX1 (101). The power receiving device RX3 (106) is located on the power transmission device TX3 (103) and power is wirelessly transferred to the power receiving device RX3 (106) from the power transmission device TX3 (103). The power receiving devices RX4 (107) and RX5 (108) are located on the power transmission device TX2 (102). Power is wirelessly transferred to each of the power receiving devices RX4 (107) and RX5 (108) from the power transmission device TX2 (102).

Figure 2:
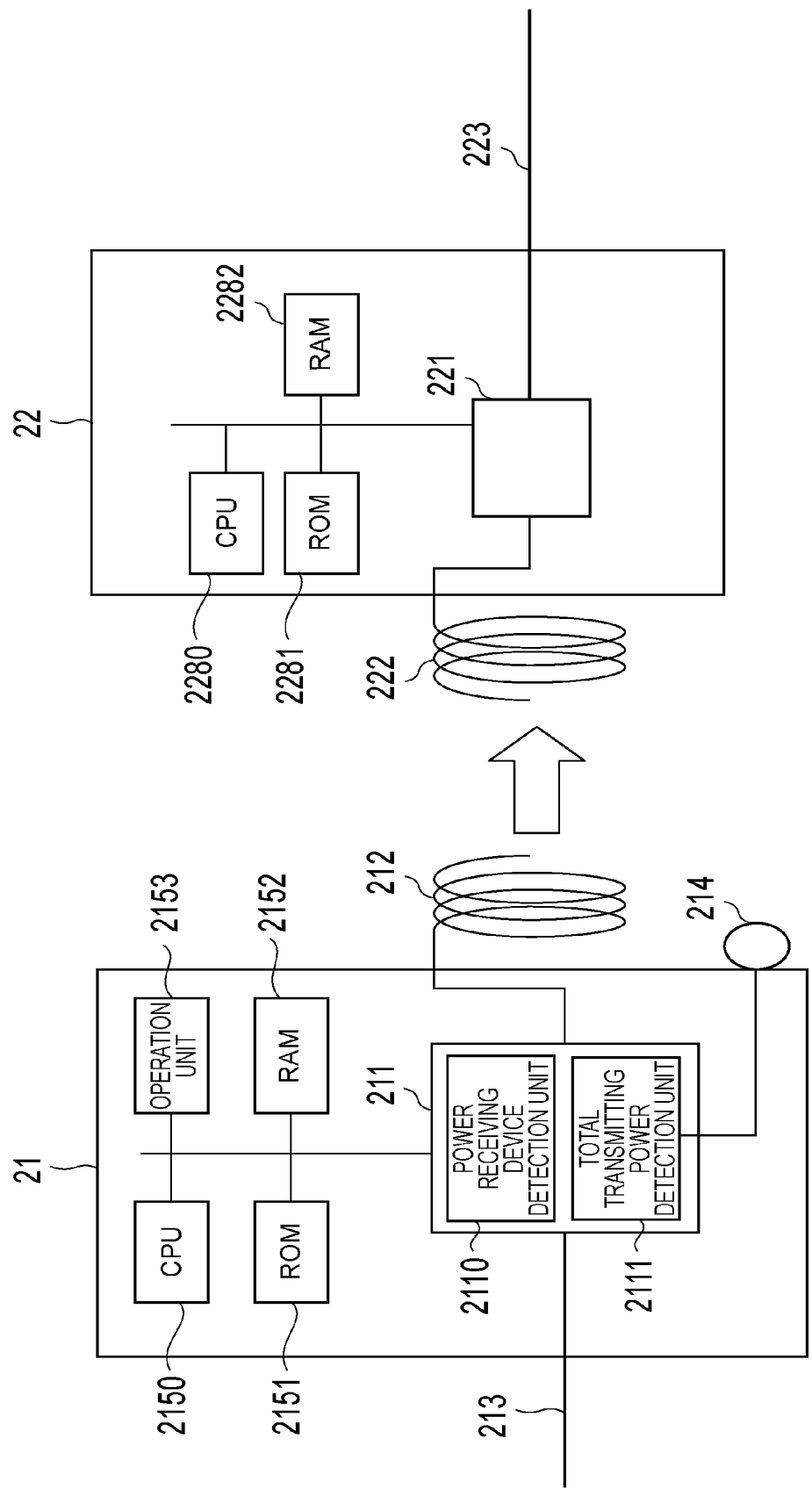
FIG. 2 is a block diagram of the configurations of a power transmission device and a power receiving device.

Configurations of a power transmission device 21 and a power receiving device 22 of the present embodiment are shown in FIG. 2. The power transmission device 21 changes power supplied from a power line 213 into a higher frequency at a power transmission circuit 211 and wirelessly transmits power from a power transmission antenna 212. The power transmission circuit 211 includes a power receiving device detection unit 2110 which detects, by an impedance change and the like, that the power receiving device has been arranged at a position suitable for transmitting power. Also, the power transmission circuit 211 includes a total transmitting power detection unit 2111 which detects a sum total (the total amount of the transmitting power) of the transmitting power. The power transmission circuit 211 can concurrently transmit power to a plurality of power receiving devices based on the control of a CPU 2150 described below. A notification unit 214 notifies a user of a wireless power transfer state. In FIGS. 1A and 1B, the notification unit 214 notifies the user of the wireless power transfer state by emission of light from an LED lamp and the like. A notification in regard to the wireless power transfer notified by the notification unit 214 is a notification (hereinafter referred to as notification A) indicating that an additional power receiving device can be accepted and the power transmission device 21 can start to transmit power to the additional power receiving device. Another notification in regard to the wireless power transfer notified by the notification unit 214 is a notification (hereinafter referred to as notification B) indicating that an additional power receiving device cannot be accepted and the power transmission device 21 cannot start to transmit power to the additional power receiving device.

In the present embodiment, the notification unit 214 notifies the respective notifications A and B by the emission of different colors. The notification unit 214 may notify the respective notifications A and B by the emission of different flickering patterns. For example, a notification (notification A) indicating that the power transmission is available may be "lighting", and a notification (notification B) indicating that the power transmission is not available may be "extinction". The notification unit 214 of the present embodiment is configured to notify the user of the wireless power transfer state by the emission of light from the LED lamp and the like. However, the notification unit 214 may be configured to notify by an image or a message on a display and the like. The notification may be an audio output by a speaker. Also, the notification may be a vibration generated by an oscillator and the like.

The transmission device 21 includes a central processing unit (CPU) 2150, a random access memory (RAM) 2151, and a read only memory (ROM) 2152. The CPU 2150 controls the entire device by reading a control program stored in the ROM 2152 into the RAM 2151 and executing the same. The transmission device 21 also includes an operation unit 2153 for the user to input various data and operate the device.

A configuration of the power receiving device will be described next. The power receiving device 22 rectifies wireless power received from a power receiving antenna 222 and supplies power to a power line 223 via a power receiving circuit 221 such as a constant voltage circuit which converts power. The received power may be supplied to a secondary power source such as a battery (not shown) via the power line 223, or may be directly supplied to hardware of the device as a power source. The power receiving device 22 includes a CPU 2280, a RAM 2282, and a ROM 2281. The CPU 2280 controls the entire device by reading a control program stored in the ROM 2281 into the RAM 2282 and executing the same.

An operation of the wireless power transfer system of the present embodiment having the above configuration will be described. The power transmission device in the wireless power transfer system of the present embodiment can transmit power to a plurality of power receiving devices. The power receiving device of the present embodiment can appropriately perform a power receiving operation by receiving power of 5 W. The power receiving operation is a battery charge of the power receiving device and an operation by supplied power. The power transmission device of the present embodiment can transmit power up to 10 W. Therefore, the power transmission device can concurrently transmit power to two power receiving devices. However, the power transmission device cannot concurrently and appropriately transmit power to three power receiving devices.

The power transmission device in the wireless power transfer system of the present embodiment notifies that the power transmission device can transmit power to a second power receiving device during the power transmission to a first power receiving device. Also, the power transmission device detects the second power receiving device during the power transmission to the first power receiving device and notifies that the power transmission device cannot transmit power to a third power receiving device in response to the start of the concurrent power transmission to the first power receiving device and the second power receiving device.

In FIG. 1A, the respective power transmission devices TX1 to TX3 have illuminants such as an LED lamp. A notification in regard to the wireless power transfer including a notification whether the power transmission to an additional power receiving device is available is provided by emission of light from the illuminants. In FIG. 1A, the power transmission device TX1 (101) only transmits power to the single power receiving device RX2 (105) and has enough power to transmit to the additional power receiving device. Therefore, the power transmission device TX1 (101) notifies that the power transmission to the additional power receiving device is available. The power transmission device TX2 (102) transmits power to the plurality of power receiving devices RX4 (107) and RX5 (108) and does not have enough power to transmit to the additional power receiving device. Therefore, the power transmission device TX2 (102) notifies that power transmission to the additional power receiving device is not available and issues a warning to prevent the user from placing the additional power receiving device on a power transmission surface. The power transmission device TX3 (103) only transmits power to the single power receiving device RX3 (106) and has enough power to transmit to the additional power receiving device. Therefore, the power transmission device TX3 (103) notifies that the power transmission to the additional power receiving device is available.

Here, the user of the power receiving device RX1 (104), which needs to be newly charged, can determine which power transmission device may be used according to the notifications from the power transmission devices described above. For example, in FIG. 1A, the user of the power receiving device RX1 (104) can recognize that the power transmission device TX2 (102), which is closest to the power receiving device RX1 (104), cannot transmit power to the additional power receiving device. Also, the user of the power receiving device RX1 (104) can easily recognize, before placing the power receiving device on the power transmission device TX2 (102), that the power transmission device TX2 (102) cannot transmit power and that the user should select another power transmission device. The user of the power receiving device RX1 (104) is assumed to have recognized that the power transmission device TX2 (102) cannot be used and started charging by placing the power receiving device RX1 (104) on the power transmission device TX3 (103). FIG. 1B is a system configuration diagram showing the state after starting charging by placing the power receiving device RX1 (104) on the power transmission device TX3 (103). The power transmission device TX3 (103) determines that it cannot concurrently transmit power to a further power receiving device when the power transmission device TX3 (103) starts to transmit power to the power receiving device RX1 (104). The power transmission device TX3 (103) then provides a notification in accordance with the result of the determination.

In this way, the power transmission device of the present embodiment determines whether the power transmission to the additional power receiving device is available at the timing of starting to transmit power to the power receiving device and notifies the result of the determination. Therefore, the user can determine whether the user can use the power transmission device before placing the additional power receiving device on the power transmission device. As a result, a problem that charging is not executed even though the power receiving device is placed on the power transmission device can be reduced. Also, for example, the user can easily select which power transmission device can be used for receiving power when the plurality of power transmission devices is located around.

An operation of the power transmission device of the present embodiment is described by using a flowchart shown in FIG. 3. The CPU 2150 of the power transmission device executes the control program so as to control the entire device so that the flowchart of FIG. 3 is realized. First, the notification unit 214 of the power transmission device provides a notification (notification A) indicating that the power transmission immediately after the power-on is available (S301). Subsequently, the power receiving device detection unit 2110 starts detection processing (S302) to detect the power receiving device placed on the power transmission device. The power receiving device detection unit 2110 may detect the power receiving device existing in a wireless power transferable area from the power transmission device even though the power receiving device is not placed on the power transmission device. An example of the detection processing of the present embodiment is the processing to detect an impedance change near the power transmission circuit 211 based on power generated in a circuit inside the power transmission device in consequence of placing the power receiving device near the antenna 212 emitting electromagnetic waves. In the detection processing, the power receiving device and a position of the power receiving device are detected by detecting the impedance change.

When a new power receiving device is detected through the detection processing, the CPU 2150 determines whether the power transmission device is transmitting power to another power receiving device different from the detected power receiving device. When the CPU 2150 has determined that the power transmission device has been transmitting power to the other power receiving device (S303: Yes), the CPU 2150 controls the power transmission circuit 211 and stops the power transmission (S304). In a case where power receiving device has been detected only after the power-on, the power transmission device has not been transmitting power to the other power receiving device. Therefore, the processing proceeds to S305. The power receiving device detection unit 2110 determines a position of the newly detected power receiving device based on the amount of the impedance change. When the newly detected power receiving device is at an appropriate position for the power transmission (S305: Yes), the CPU 2150 controls the power transmission circuit 211 and starts the power transmission (S306). The position appropriate for the power transmission is defined based on a distance (positional relation) between the power transmission antenna 212 and the power receiving antenna 222 and is in a range where the transmission efficiency is equal to or more than a predetermined value (here, it is assumed to be 70%). When it is determined that the other power receiving device is in the middle of the power transmission through the processing of S303, in S306, the power transmission device starts transmitting power to all power receiving devices including the other power receiving device in the middle of the power transmission and the newly detected power receiving device in S302.

On the other hand, in S305, when the power receiving device detection unit 2110 has determined that the newly detected power receiving device does not exist at the appropriate position, the power transmission device does not start the power transmission and stays in a power transmission stop state. This is because heat may be generated due to a low power transmission efficiency caused when the power transmission device and the power receiving device do not transmit power to each other at the appropriate position. When the newly detected power receiving device does not exist at the appropriate position, the notification unit 214 may notify to prompt the user to place the power receiving device at the appropriate position. When a circuit for an impedance control which does not heat the power receiving device is provided in the wireless power transfer system, the power transmission device may not stop the power transmission when the new power receiving device is detected. More specifically, when the second power receiving device has been detected during the power transmission to the first power receiving device which controls the impedance, the power transmission to the first power receiving device may be continued. In the case of such a wireless power transfer system, the processing of S304 is omitted.

When the power receiving device detection unit 2110 detects that the newly detected power receiving device is at the appropriate position for the power transmission (S305: Yes), the CPU 2150 controls the power transmission circuit 211 and starts the power transmission (S306). The power transmission in S306 is assumed to be performed by using a predetermined power value (5 W, as described above) per power receiving device. The power to the pre-placed power receiving device is assumed to be the same as the power transmitted before stopping the power transmission in S306. Also, the power for the power transmission in S306 may be equally allocated to the respective detected power receiving devices.

Here, the total transmitting power detection unit 2111 detects the sum total of the transmitting power to all the power receiving devices receiving power (S307). The CPU 2150 compares the transmittable upper limit power (10 W, as described above) of the power transmission device with the sum total of the above transmitting power. The CPU 2150 determines whether the difference (transmittable power) between the upper limit power and the sum total of the transmitting power can be transmitted to a further power receiving device (S308). When the determination is made in S308 of the present embodiment, the power transmission device holds the threshold of the predetermined power enough to transmit power to a single power receiving device. In the present embodiment, the threshold of the power described above is assumed to be 5 W, because the power receiving device receives the power of 5 W. When the transmittable power of the power transmission device exceeds the held threshold, the CPU 2150 determines that the power transmission to the further power receiving device is available. On the other hand, when the transmittable power of the power transmission device falls below the held threshold, the CPU 2150 determines that the power transmission to the further power receiving device is not available. The determination in S308 is made based on the sum total of the transmitting power. However, the number of the power receiving devices to which power can be transmitted may be determined in advance, and the CPU 2150 may determine whether the number of the power receiving devices, which are concurrently receiving power, has reached the predetermined number. In the present embodiment, each power receiving device receives the power of 5 W, and the upper limit power of the power transmission device is 10 W. Therefore, the power transmission device can concurrently transmit power to two power receiving devices. In this case, the power transmission device may count the number of the power receiving devices which are receiving power, and the determination standard in S308 may be the detection of the start of the power transmission to two power receiving devices.

When it is determined in S308 that the power transmission to the further power receiving device is not available, the notification unit 214 provides the notification (notification B) indicating that the power transmission is not available. The CPU 2150 is configured to periodically make the determination in S308 when it is determined that the power transmission to the further power receiving device is not available. This is because, in the case where the power receiving device charges a secondary battery such as a battery with the received power, the necessary power is gradually reduced in accordance with the charge amount of the power receiving device which is receiving power, and thus the result of the determination in S308 changes.

The CPU 2150 of the power transmission device repeats the above processing unless the power source of the device is turned off (S310: No). Although S310 of the power transmission device is provided after the determination whether the additional power transmission to the further power receiving device is available (S308), the detection of the operation to turn off the power source may be made at any timing. Upon detection of the operation to turn off the power source, this processing is terminated (S310: Yes).

As described above, in the present embodiment, the power transmission device determines whether the power transmission to the second power receiving device is available at the timing of starting to transmit power to the first power receiving device and notifies the result of the determination. Therefore, the situations where the charging is not executed even though the power receiving device is placed on the power transmission device can be reduced, because the user can determine whether the power transmission device is usable before placing the second power receiving device on the power transmission device. Also, for example, when there are a plurality of power transmission devices around, the user can easily select which power transmission device may be used for receiving power.

Second Embodiment

In the second embodiment, a power transmission device receives a required power value from a power receiving device through communication and notifies whether the power transmission of the required power value is available.

Figure 4B:
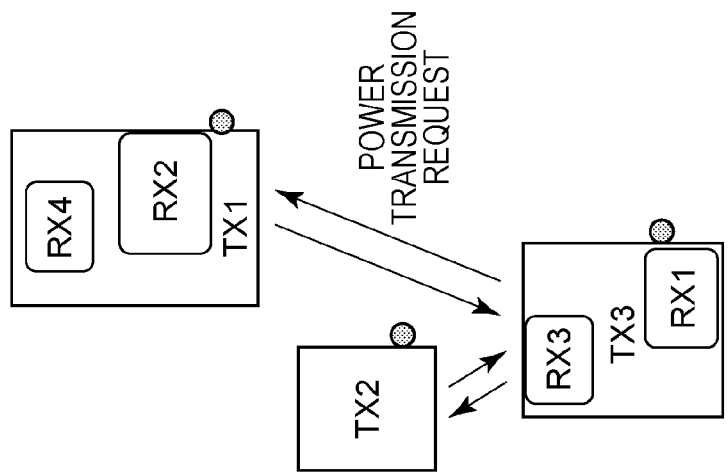
FIGS. 4A and 4B are diagrams of a wireless power transfer system of a second embodiment.
Figure 4A:
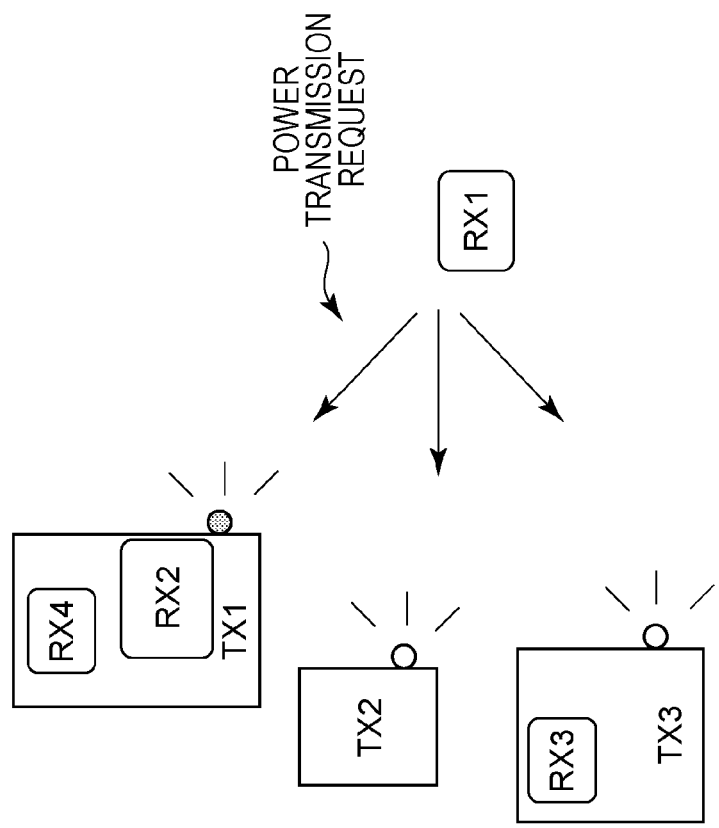

FIG. 4A is a block diagram of a wireless power transfer system of the second embodiment of the present embodiment. The wireless power transfer system includes three power transmission devices TX1 to TX3 and four power receiving devices RX1 to RX4. In FIG. 4A, the power receiving device RX1 starts to charge through the wireless power transfer. The power receiving devices RX2 and RX4 are located on the power transmission device TX1 and wirelessly receive power from the power transmission device TX1. The power receiving device RX3 is located on the power transmission device TX3 and wirelessly receives power from the power transmission device TX3.

Figure 5:
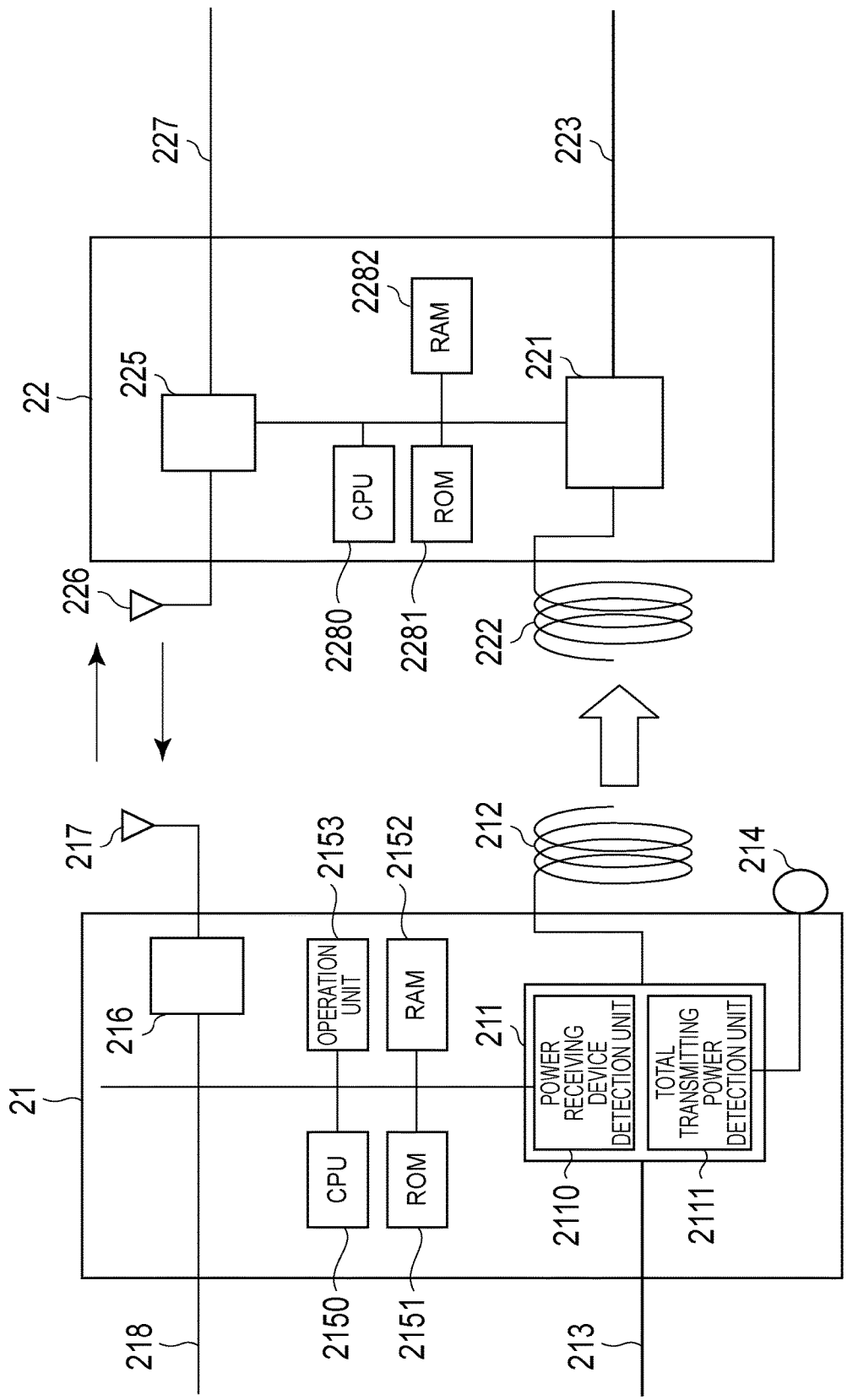
FIG. 5 is a block diagram of the configurations of a power transmission device and a power receiving device of the second embodiment.

The configuration of the wireless power transfer device of the second embodiment is shown in FIG. 5. The units corresponding to those in FIG. 2 described in the first embodiment are denoted with the same reference numerals, and the explanation thereof is omitted. The configuration of the power transmission device of the present embodiment is different from that of the first embodiment in that the out-band communication is available. In the out-band communication, a different frequency from an electromagnetic wave is used for the wireless power transfer by further providing a wireless communication unit 216, an antenna 217, and a communication line 218. Also, the power receiving device of the present embodiment can wirelessly communicate with the power transmission device by having a wireless communication unit 225, a communication line 227, and an antenna 226.

The wireless communication units 216 and 225 are chips for the wireless communication such as Bluetooth, a wireless LAN (IEEE802.11 series), a wireless USB, and near field communication (NFC). The communication lines 218 and 227 are signal lines to transfer communication data. The antennae 217 and 226 are antennae to radiate or receive the electromagnetic wave for the communication.

Figure 7:
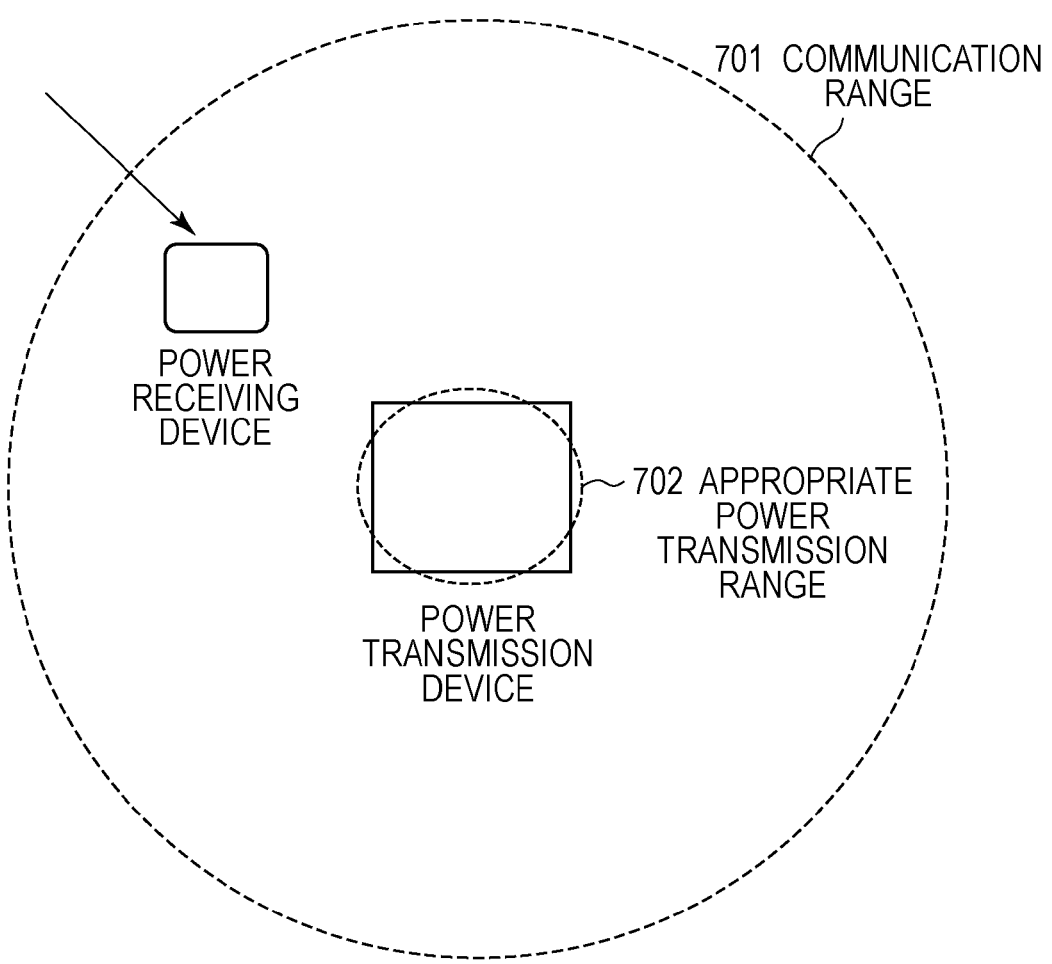
FIG. 7 is a diagram of a communication range and an appropriate efficiency transfer range of the wireless power transfer system.

FIG. 7 is a diagram of a communication range 701 and an appropriate power transmission range 702 in which the power transmission device 21 can transmit power with an appropriate efficiency. Generally, the wireless communication range of the Bluetooth, the wireless LAN, the wireless USB or the like is equal to or more than a few meters. That is, in the case where the plurality of power transmission devices TX1 to TX3 exist within a few meters or less from the communicable range 701, the respective power transmission devices can receive a power transmission request (power demand) from the power receiving device RX1. In this way, the explanation is made assuming that the wirelessly communicable distance is longer than the wirelessly power transferable distance. In FIG. 4A, the power receiving device RX1 transmits a power transmission request (power demand) including necessary power to the power transmission devices TX1 to TX3. The power transmission device TX1 is already transmitting power to the power receiving devices RX2 and RX4 and cannot transmit power included in the power transmission request. Therefore, the power transmission device TX1 notifies that the power transmission is not available. The power transmission device TX2 does not transmit power to any power receiving devices and can transmit power to the power receiving device RX1 which has transmitted the power transmission request. Therefore, the power transmission device TX2 notifies that the power transmission is available. Even though the power transmission device TX3 is transmitting power to the power receiving device RX3, the power transmission device TX3 has enough power to transmit and can transmit power to the power receiving device RX1 which has transmitted the power transmission request. Therefore, the power transmission device TX3 notifies that the power transmission is available.

The user, who needs the power receiving device RX1 to receive power, can confirm that the power transmission device, which notifies that the power transmission is available, can transmit power included in the power transmission request from the power receiving device RX1. In FIGS. 4A and 4B, the power transmission device TX2 or TX3 can wirelessly transfer power to the power receiving device RX1. Further, as shown in FIG. 4B, in the present embodiment, when the user of the power receiving device RX1 has selected the power transmission device TX3 and has placed the power receiving device RX1 on the power transmission device TX3, the power transmission device TX3 which has started to transmit power to the power receiving device RX1 stops notifying that the power transmission is available. The power transmission device TX3 waits for receiving a next power transmission request from the power receiving device.

On the other hand, there is a possibility that even though the power transmission device TX2 has notified that the power transmission is available, the power transmission device TX2 continues to notify that the power transmission is available without detecting the power receiving device RX1. In the present embodiment, the power transmission device which has started to transmit power or the power receiving device which has started to receive power notifies that the power transmission device/power receiving device has started to transmit/receive power to/from another power transmission device located around. The power transmission device, which has received the power transmission request from the power receiving device and has notified that the power transmission is available, stops notifying that the power transmission is available in accordance with the reception of the notification indicating that the transmission/reception of power has been started. In the example in FIG. 4B, the power transmission device TX3 which has started to transmit power transmits a power transmission start notification via the wireless communication unit 216 to the power transmission devices TX2 and TX1. The power transmission device TX2 which has received the power transmission start notification stops notifying that the power transmission is available. The power transmission device TX1 which has received the power transmission start notification stops notifying that the power transmission is not available. The power transmission start notification includes an identifier of the power transmission device which has started the power transmission and an identifier of the power receiving device which has started to receive power.

In the case where the notification unit 214 includes an illuminator such as an LED lamp, a power transmission available notification may be lighting of the lamp, and a power transmission unavailable notification may be extinction of the lamp. In this case, the lamp remains turned off when the power transmission device has determined that the power transmission is not available in response to the power transmission request from the power receiving device. When the power transmission start notification from the other device has been received, the lamp may remain turned off.

Figure 6:
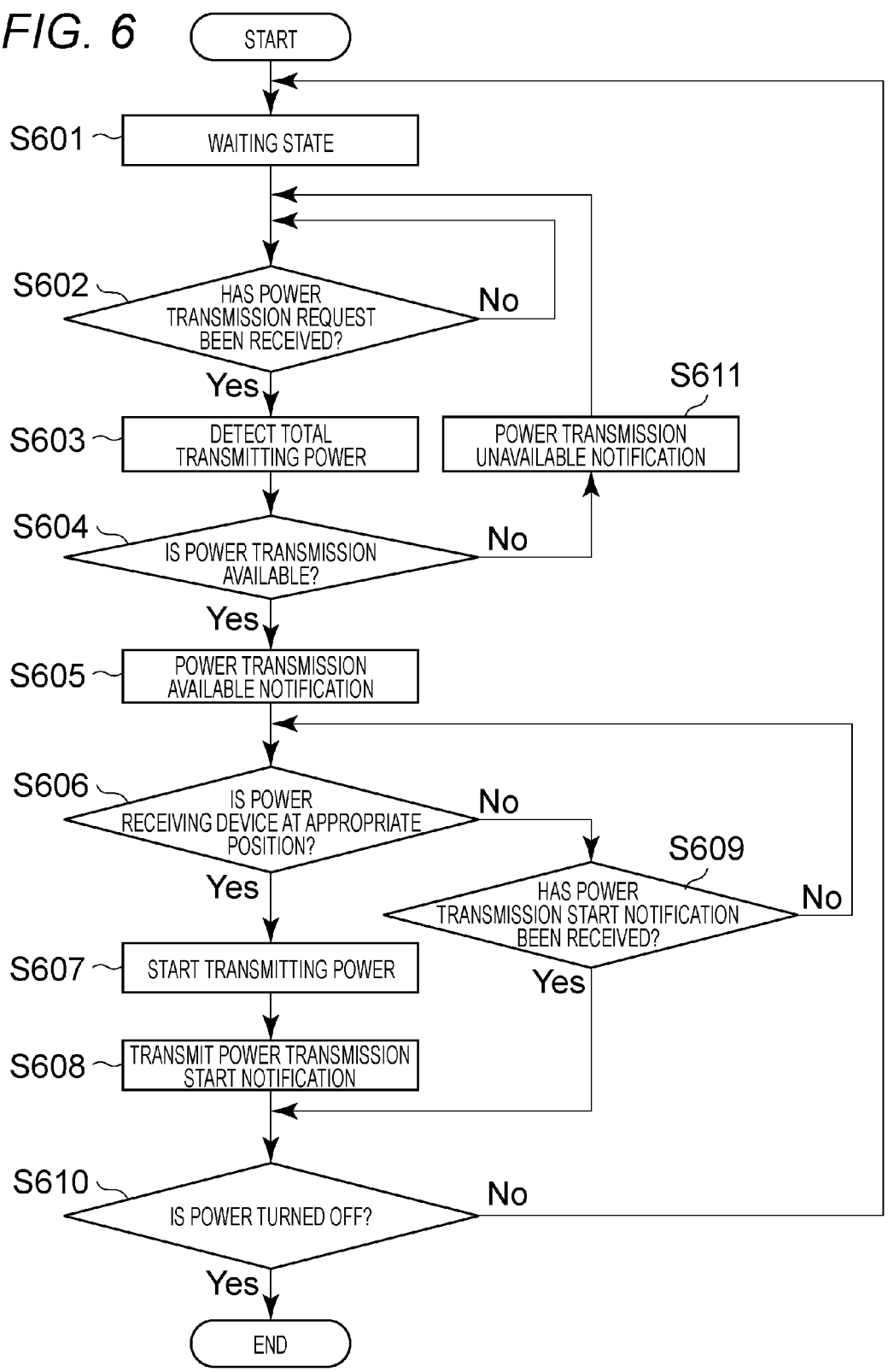
FIG. 6 is a flowchart of the power transmission device of the second embodiment.

The operation of the power transmission device in the present embodiment is described by using a flowchart shown in FIG. 6. The CPU 2150 of the power transmission device executes the control program so as to control the entire device so that the flowchart of FIG. 6 is realized. When the CPU 2150 of the power transmission device starts processing, the CPU 2150 enters a waiting state in which the CPU 2150 waits for receiving the power transmission request from the power receiving device (S601). In the waiting state, the notification by the notification unit 214 is not performed. The CPU 2150 then determines whether the power transmission request from the power receiving device has been received via the wireless communication unit 216 (S602). Upon receiving the power transmission request, the power transmission device detects the sum total of the transmitting power to all the power receiving devices which are receiving power, by using the total transmitting power detection unit 2111 (S603). The CPU 2150 determines whether the power of the power value required by the power receiving device included in the received power transmission request can be transmitted (S604). When it is determined that the transmission is available in S604, the notification unit 214 notifies that the transmission is available (S605). When it is determined that the transmission is not available in S604, the notification unit 214 notifies that the transmission is not available (S611). The operation of the power transmission returns to S601 to wait for a next power transmission request.

When the notification unit 214 has notified that the power transmission is available, the power receiving device detection unit 2110 confirms whether the power receiving device is located in an appropriate range for the power transmission, i.e., the range 702 in FIG. 7 (S606). The CPU 2150 controls the power transmission circuit 211 and starts the power transmission when the power receiving device is located at the appropriate position for the power transmission (S607). After starting the power transmission, the wireless communication unit 216 transmits the power transmission start notification to other power transmission devices around the power transmission device (S608). On the other hand, in the case where the power receiving device is not at the appropriate position for the power transmission (S606: No), the wireless communication unit 216 determines whether the power transmission start notification has been received (S609). When the power transmission start notification from the other power transmission device has been received (S609: Yes), unless the power source is turned off (S610: No), the power transmission device returns to the waiting state and stops notifying that the power transmission is available (S601). When the notification of S611 indicating that the power transmission is not available is not provided by the extinction state of the lamp, the notification indicating that the power transmission is not available is similarly stopped.

As described above, in accordance with the present embodiment, the power transmission device which can transmit power to the plurality of power receiving devices determines whether the power transmission is available to the power receiving device in accordance with power required by the power receiving device through communication and notifies the result of the determination. Therefore, the user can determine whether the power transmission device is usable before placing the power receiving device on the power transmission device by using the communication having a wider communicable range than the wirelessly power transferable range. Also, a notification in regard to the wireless power transfer can be provided before the power receiving device is placed in a distance where the wireless power transfer with the power transmission device is available by using the communication having a wider communicable range than the wirelessly power transferable range. This makes it possible to reduce situations in which the charging is not executed even though the power receiving device is placed on the power transmission device. Also, for example, the user can easily select which power transmission device can be used for receiving power when a plurality of power transmission devices is located around.

Next, in the present embodiment, there will be described an example of a notification of a state of the wireless power transfer of the power transmission device in the case where the notification based on a power transmission request from a first power receiving device is provided and a power transmission request from a second power receiving device different from the first power receiving device is received. In this example, the notification unit 214 provides a notification (notification A) indicating that the power transmission is available when the power transmission for respective received power transmission requests from the plurality of power receiving devices is available. Also, the notification unit 214 provides a notification (notification B) indicating that the power transmission is not available when the power transmission for respective received power transmission requests from the plurality of power receiving devices is not available. When the power transmission is available for one of the received power transmission requests from the plurality of power receiving devices and is not available for the other, a notification indicating such a state (hereinafter referred to as notification C) is provided. In the case where the notification unit 214 includes an illuminator such as an LED lamp, a power transmission available notification may be lighting of the lamp, and a power transmission unavailable notification may be extinction of the lamp. The notification C described above may be provided by a blink of the lamp.

The operation of the power transmission device in this example will be described. When the power transmission device is notifying whether the power transmission is available based on the power transmission request from the first power receiving device and receives the power transmission request from the second power receiving device, the power transmission device determines whether the detail of the notification is the same as the result of the determination as to whether the power transmission is available based on the request from the second power receiving device. For example, it is assumed that when the power transmission device has 10 W of transmittable power, the power transmission device has received a power transmission request for requiring the power of 5 W from the first power receiving device. In this case, the power transmission device can transmit power to the first power receiving device. Therefore, the power transmission device provides the notification A. It is assumed that the power transmission device has received a power transmission request for requiring power of 10 W from the second power receiving device while providing the notification A. The power transmission device determines whether the determination to the request from the first power receiving device is the same as the determination as to whether the power transmission is available for the request of the power of 10 W from the second power receiving device. In this case, the power transmission device has 10 W of transmittable power, and thus the power transmission device can transmit the power of 10 W, required by the second power receiving device, to the second power receiving device. Therefore, the power transmission device determines that the result of the determination to the request from the first power receiving device is the same as the result of the determination as to whether the power transmission is available for the request from the second power receiving device. The power transmission device continues to provide the notification A or the notification B based on the power transmission request from the first power receiving device when the result of the determination as to whether the power transmission required by the second power receiving device is available is the same as the result as to whether the power transmission required by the first power receiving device is available. In the above example, the power transmission device continues to provide the notification A, because the result of the determination as to whether the power transmission required by the second power receiving device is available is the same as the result as to whether the power transmission required by the first power receiving device is available.

A case will be described where the respective power transmissions responding to the requests from the first and second power receiving devices are available, and the power transmission device detects the first power receiving device or the second power receiving device in the power transmittable range of the power transmission device when the power transmission device is providing the notification A. In this case, the power transmission device determines whether the remaining power after the start of the power transmission to the detected device is enough for the power required by the other device. After the start of the power transmission, the notification based on the request from the other device may be provided. In the example above, the power transmission device is assumed to detect the first power receiving device in the power transmittable range and to start the power transmission when the power transmission device is providing the notification A based on the power transmission requests from the first and second power receiving devices. Since the first power receiving device has required the power of 5 W, remaining power of the power transmission device after the start of the power transmission to the first power receiving device is 5 W (a value obtained by subtracting the power of 5 W required by the first power receiving device from the transmittable power of 10 W). Since the power transmission device cannot transmit the power (10 W) required by the second power receiving device with the remaining power of 5 W, the power transmission device starts to provide the notification B. When receiving the respective power transmission start notifications indicating that the first and second power receiving devices have started to receive power, the power transmission device may return to the waiting state described above (S601).

On the other hand, the power transmission device starts to provide the notification C in the case where the result of the determination as to whether the power transmission required by the second power receiving device when the power transmission device is providing a notification based on the power transmission request from the first power receiving device is available is not the same as the result as to whether the power transmission required by the first power receiving device is available. As an example of this case, it is assumed that when having the transmittable power of 10 W, the power transmission device has received a power transmission request requiring the power of 5 W from the first power receiving device. The power transmission device is assumed to be required by the second power receiving device to transmit the power of 15 W in the case where the power transmission device is providing the notification A while transmitting power to the first power receiving device in response to the request from the first power receiving device since the power transmission device can transmit the power of 5 W to the first power receiving device. As the power transmission device has the transmittable power of 10 W, the power transmission device determines that the power transmission of 15 W required by the second power receiving device is not available. The power transmission device starts to provide the notification C since the result of the determination, which has been notified, as to whether the power transmission responding to the request from the first power receiving device is available is not the same as the result of the determination as to whether the power transmission responding to the received request from the second power receiving device is available. The timing to stop providing the notification C is when the power transmission device receives the power transmission start notification responding to one of the first power receiving device and the second power receiving device while providing the notification C. The power transmission device changes the notification to one corresponding to the result of the determination as to whether the power transmission is available based on the power transmission request from the other.

With this configuration, when the plurality of power receiving devices exists, there will be no need to change or stop providing the notification at every time of receiving the power transmission request from respective power receiving devices or the power transmission start notification from the other power transmission device. Therefore, the confusion of the user will be reduced.

In the present embodiment, there will be described another example of a notification of a state of the wireless power transfer of the power transmission device in the case where the notification based on the power transmission request from the first power receiving device is provided, and the power transmission request from the second power receiving device different from the first power receiving device is received. In the above example, the power transmission device respectively determines whether the power transmissions responding to the request from the first and second power receiving devices are available and provides the notification based on whether the results of the determination are the same. In this example, the power transmission device determines whether the power transmission to both the first and second power receiving devices is available in the case where the power transmission device has received a power transmission request from the second power receiving device different from the first power receiving device while providing a notification based on the power transmission request from the first power receiving device. The power transmission device provides a notification based on the determination as to whether the power transmission to both the first and second power receiving devices is available.

A notification method of this example will be described by showing a specific example. For example, the power transmission device is assumed to have received a power transmission request requiring the power of 5 W from the first power receiving device while having the transmittable power of 15 W. In this case, the power transmission device is providing the notification A since the power transmission device can transmit power to the first power receiving device. The power transmission device is assumed to have received a power transmission request requiring the power of 10 W from the second power receiving device while providing the notification A. Since the power transmission device has the transmittable power of 15 W, the power transmission device can transmit the power of 15 W, which is the total of 5 W required by the first power receiving device and 10 W required by the second power receiving device, to the first and second power receiving devices. Therefore, the power transmission device provides the notification A when determining that the power transmission to both the first power receiving device and the second power receiving device is available.

The power transmission device is assumed to have received a power transmission request requiring the power of 5 W from the first power receiving device when having the transmittable power of 10 W. In this case, the power transmission device is providing the notification A since the power transmission device can transmit power to the first power receiving device. The power transmission device is assumed to have received a power transmission request requiring the power of 10 W from the second power receiving device while providing the notification A. Since the power transmission device has the transmittable power of 10 W, the power transmission device cannot transmit the power of 15 W, which is the total of 5 W required by the first power receiving device and 10 W required by the second power receiving device, to the first and second power receiving devices. Although the power transmission device cannot transmit power to both the first power receiving device and the second power receiving device, the power transmission device provides the notification C when determining that the power transmission to one of the power receiving devices is available.

The power transmission device is assumed to have received a power transmission request requiring the power of 5 W from the first power receiving device when having the transmittable power of 3 W. In this case, the power transmission device is providing the notification B since the power transmission device cannot transmit power to the first power receiving device. The power transmission device is assumed to have received a power transmission request requiring the power of 10 W from the second power receiving device while providing the notification B. In this case, since the power transmission device has the transmittable power of 3 W, the power transmission device cannot transmit the power of 15 W, which is the total of 5 W required by the first power receiving device and 10 W required by the second power receiving device, to the first and second power receiving devices. The power transmission device provides the notification B when determining that the power transmission device cannot transmit power to either the first power receiving device or the second power receiving device.

By having this configuration, when the plurality of power receiving devices exists, the power transmission device can provide a notification with consideration for all the power transmission requests from the respective power receiving devices.

Other Embodiment

In the above embodiment, when the power transmission device, which has been providing a notification that the power transmission is not available, has detected a new power receiving device in the power transmittable range, the power transmission device may issue a warning to a user indicating that the power transmission to the detected power receiving device is not available. The warning may be issued by hardware different from the notification unit 214. For example, a lamp to indicate an error state may be provided and lighted. Also, a warning message such as "The supply of power is not enough." may be displayed when a liquid crystal panel or the like is included. As the warning message, a message indicating that the power transmission to a newly placed power receiving device is not available and a message prompting to remove (move) the newly placed power receiving device may be displayed on a display device such as a display.

In the above embodiment, when the power transmission device newly detects a power receiving device in a state in which the transmittable power is less than the necessary power of the power receiving device, the power transmission device may make an inquiry to the user whether to continue to supply power even though the power is not enough. By making the inquiry, when the power transmission device has detected, via the operation unit 2153, an instruction by the user to perform a power transmission in the state in which the power is not enough, the power transmission to the power receiving device is started in the state in which the power is not enough.

In the above embodiment, information on a class defining the transmitting/receiving power may be transmitted between the power transmission device and the power receiving device. For example, class 1 is assumed to transfer power of 5 W, class 2 is assumed to transfer power of 12 W, and class 3 is assumed to transfer power of 20 W. In this way, by defining the transmitting/receiving power by a plurality of values in advance, the power transmission device can transmit power at an appropriate power value depending on the size and type of the power receiving device.

Figure 8D:
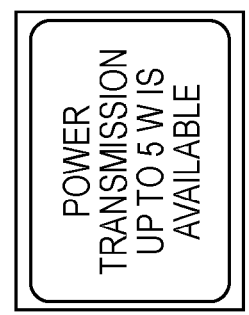
FIGS. 8A to 8D are diagrams of an exemplary notification of a notification unit.
Figure 8C:
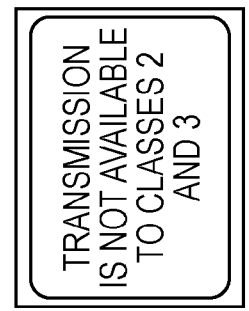
Figure 8B:
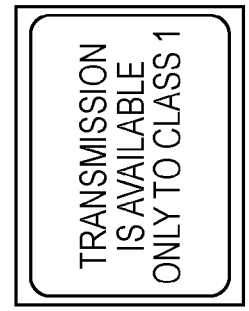
Figure 8A:
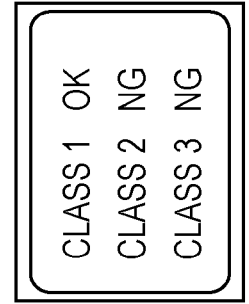

In this case, the power transmission device may be configured to determine whether the power transmission to the device, with which the power transmission device has communicated, is available based on the communicated information on the class. Even though the power transmission device is notifying that the power transmission is available, the power transmission device may be configured to issue a warning when detecting the power receiving device which is not in the suitable class. The information on the class corresponding to the power transmission request shown in the second embodiment may be included. The power transmission device may be configured to notify that the power transmission is not available even though the power transmission device has enough transmittable power, when a class of the power receiving device, from which the power transmission request has been received, is different from the class of the power transmission device. In the power transmission device of the above embodiment, the case where the remaining power cannot be transmitted to the power receiving device requiring the power of classes 2 and 3, but the remaining power can be transmitted to the power receiving device of class 1 may occur. In this case, the notification unit 214 of the power transmission device may be configured to notify that the power transmission to the power receiving device of class 1 is available or that the power transmission to the power receiving device of classes 2 and is not available. As an example of the notification, messages such as those in FIGS. 8A to 8C are displayed on a display device such as a display.

In the above embodiment, the notification unit 214 may be configured to notify the transmittable power. As an example of the notification of the transmittable power, a message such as one in FIG. 8D is displayed on the display device such as the display.

In the above embodiment, the communication between the power transmission device and the power receiving device may be not only the out-band communication but also the data transfer by in-band communication through an amplitude modulation of the transmitting power, a load modulation of the power transmitting/receiving impedance or the like.

In the above embodiment, the notification unit 214 has notified that the power transmission is available when the power transmission device can accept a new power receiving device and can transmit power to the same regardless of the present power transmission state, but the notification unit 214 has not provided a notification to indicate the present power transmission state. The notification unit 214 may be configured to notify the information as to whether the power transmission device is performing the power transmission so that the user can determine whether the power transmission is properly being performed. A notification unit which notifies whether the power transmission device is performing the power transmission may be provided separately from the notification unit 214.

The above notifications have been provided by the power transmission device, but the notification may be transmitted to the power receiving device and may be displayed by the power receiving device. The power receiving device may obtain the transmittable power from the power transmission device through communication and may cause a display unit of the power receiving device to display an error, a warning or the like.

In the above embodiment, if the wireless power transfer to the plurality of other devices is available, that means the respective power control to the plurality of devices at the same time is available. For example, the wireless power transfer may be actually preformed to a single device at a certain moment when the power transmission device wirelessly transfers power to the plurality of devices by time-division. However, in such a case where the wireless power transfer is performed to the plurality of other devices by time-division, it is assumed herein that the wireless power transfer is performed to the plurality of other devices.

According to the embodiment, the device which can wirelessly transfer power to the plurality of other devices can notify the user of the wireless power transfer state.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-133525, filed Jun. 26, 2013, which is hereby incorporated by reference herein in its entirety.

What is claimed is:

1. A wireless power transfer device, comprising:
a power transmission antenna configured to wirelessly transfer power to a plurality of wireless power receiving devices; and
a CPU configured to cause the wireless power transfer device to
provide, in a case where the power transmission antenna is transmitting power greater than a predetermined value to a first wireless power receiving device, a first notification that wireless power transfer to a second wireless power receiving device different from the first wireless power receiving device is not available, and
provide, in a case where the power transmission antenna is transmitting power smaller than the predetermined value to the first wireless power receiving device, a second notification that the wireless power transfer to the second wireless power receiving device is available,
wherein the first and second notifications are visually recognizable notifications.

2. The wireless power transfer device according to claim 1, wherein the CPU is further configured to determine whether to provide the first notification that the wireless power transfer to the second wireless power receiving device is not available or to provide the second notification that the wireless power transfer to the second wireless power receiving device is available based on the power that is wirelessly transferred to the first wireless power receiving device.

3. The wireless power transfer device according to claim 2, wherein the determining further comprises determining whether to provide the first notification that the wireless power transfer to the second wireless power receiving device is not available or to provide the second notification that the wireless power transfer to the second wireless power receiving device is available based on power required by the second wireless power receiving device.

4. The wireless power transfer device according to claim 1, wherein the CPU is configured to cause the wireless power transfer device to
provide the first notification in response to reception of a power demand from the first wireless power receiving device.

5. The wireless power transfer device according to claim 1, further comprising:
a wireless communication circuit configured to transmit a power transmission start notification when the wireless power transfer to the second wireless power receiving device has started.

6. The wireless power transfer device according to claim 1, further comprising:
a wireless communication circuit configured to receive a power transmission start notification from a third wireless power receiving device,
wherein the wireless power transfer device stops the second notification in response to reception by the wireless communication circuit.

7. The wireless power transfer device according to claim 1, wherein the wireless power transfer device detects the second wireless power receiving device, according to an impedance change based on an electromagnetic wave generated from the power transmission antenna.

8. The wireless power transfer device according to claim 7, further comprising:
a display unit configured to display a warning regarding the wireless power transfer to the second wireless power receiving device in a case where the CPU provides the first notification that the wireless power transfer to the second wireless power receiving device is not available and the wireless power transfer device has detected the second wireless power receiving device.

9. The wireless power transfer device according to claim 7, wherein the CPU is configured to cause the wireless power transfer device to provide a notification to prompt to move the second wireless power receiving device in a case where the CPU provides the first notification that the wireless power transfer to the second wireless power receiving device is not available and the power transmission antenna has detected the second wireless power receiving device.

10. The wireless power transfer device according to claim 1, wherein
the wireless power transfer device is a power transmission device configured to transmit power to the second wireless power receiving device.

11. A control method for a wireless power transfer device, the control method comprising:
wirelessly transferring power to a plurality of wireless power receiving devices via a power transmission antenna; and
providing, in a case where the power transmission antenna is transmitting power greater than a predetermined value to a first wireless power receiving device, a first notification that wireless power transfer to a second wireless power receiving device different from the first wireless power receiving device is not available and providing, in a case where the power transmission antenna is transmitting power smaller than the predetermined value to the first wireless power receiving device, a second notification that the wireless power transfer to the second wireless power receiving device,
wherein the first and second notifications are visually recognizable notifications.

12. A computer-readable storage medium storing computer executable instructions for causing a computer to execute a control method, the control method comprising:
wirelessly transferring power to a plurality of wireless power receiving devices via a power transmission antenna; and providing, in a case where the power transmission antenna is transmitting power greater than a predetermined value to a first wireless power receiving device, a first notification that wireless power transfer to a second wireless power receiving device different from the first wireless power receiving device is not available and providing, in a case where the power transmission antenna is transmitting power smaller than the predetermined value to the first wireless power receiving device, a second notification that the wireless power transfer to the second wireless power receiving device, wherein the first and second notifications are visually recognizable notifications.

13. The wireless power transfer device according to claim 1, wherein the CPU is configured to cause the wireless power transfer device to provide the first notification in a case where a number of wireless power receiving devices to which the power transmission antenna is wirelessly transferring power is smaller than a number of wireless power receiving devices to which the power transmission antenna is capable of wirelessly transferring power, and to provide the second notification, in response to the power transmission antenna starting to wirelessly transfer power to a plurality of wireless power receiving devices of which a number is an upper limit of the number of wireless power receiving devices to which the power transmission antenna is capable of wirelessly transferring power, in a case where the number of wireless power receiving devices to which the power transmission antenna is wirelessly transferring power is the upper limit of the number of wireless power receiving devices to which the power transmission antenna is capable of wirelessly transferring power.

14. The wireless power transfer device according to claim 1, wherein the CPU is configured to cause the wireless power transfer device to provide the first notification or the second notification by emission of a lamp or an image to be displayed on a screen.

15. The wireless power transfer device according to claim 1, wherein the CPU is configured to cause the wireless power transfer device to provide the first notification and the second notification based on output of different colors.

16. The wireless power transfer device according to claim 1, wherein the CPU is configured to cause the wireless power transfer device to provide the first notification and the second notification based on different emission states.

17. The wireless power transfer device according to claim 1, wherein the CPU is configured to cause the wireless power transfer device to provide the second notification in response to the power transmission antenna starting to transmit power greater than the predetermined value.

* * * * *